United States Patent
Levantovsky et al.

(10) Patent No.: US 6,522,365 B1
(45) Date of Patent: Feb. 18, 2003

(54) METHOD AND SYSTEM FOR PIXEL CLOCK RECOVERY

(75) Inventors: Vladimir Levantovsky, North Andover, MA (US); Daniel J. Allen, Derry, NH (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/491,761

(22) Filed: Jan. 27, 2000

(51) Int. Cl.$^7$ .................................................. H04N 5/06
(52) U.S. Cl. ........................ 348/537; 348/536; 348/541; 348/572
(58) Field of Search ................................ 348/537, 536, 348/541, 572, 540, 547, 500, 521, 523, 524; 375/362; 331/20; H04N 5/06

(56) References Cited

U.S. PATENT DOCUMENTS

| | | | | |
|---|---|---|---|---|
| 4,654,708 A | | 3/1987 | de la Guardia et al. | 358/148 |
| 5,157,492 A | | 10/1992 | Tults | 358/148 |
| 5,260,812 A | | 11/1993 | McNeilly et al. | 358/479 |
| 5,731,843 A | * | 3/1998 | Cappels, Sr. | 348/537 |
| 5,767,916 A | * | 6/1998 | West | 348/537 |
| 5,805,233 A | * | 9/1998 | West | 348/537 |
| 6,069,578 A | * | 5/2000 | Liu et al. | 341/122 |
| 6,177,959 B1 | * | 1/2001 | Bril | 348/521 |
| 6,304,296 B1 | * | 10/2001 | Yoneno | 348/537 |
| 6,340,993 B1 | * | 1/2002 | Hasegawa et al. | 348/572 |

* cited by examiner

Primary Examiner—John Miller
Assistant Examiner—Jean W. Désir
(74) Attorney, Agent, or Firm—Testa, Hurwitz & Thibeault, LLP (57) ABSTRACT

A method of recovering a pixel clock for generating a digital image from an analog video signal is presented. The on and off-transition times for the active video portion of a digital image and the image size defined in a video standard are used to generate a pixel clock. The analog video signal is digitized according to the pixel clock and the image size of the resulting digital image is compared with the image size defined in the video standard. The pixel clock frequency is adjusted in response to the image size comparison. The optimum phase of the pixel clock relative to the analog video signal is determined through a repetitive phase adjustment technique. A first image coordinate is determined for a pixel clock at one phase and a subsequent image coordinate is determined for a pixel clock after decrementing the phase of the pixel clock. The first image coordinate and the subsequent image are compared. If the coordinates are not equal, the steps of decrementing the phase of the pixel clock and determining a corresponding image coordinate are repeated until equal coordinates are determined. The phase of the pixel clock is then adjusted by a predetermined value to yield an optimum phase.

9 Claims, 8 Drawing Sheets

METHOD AND SYSTEM FOR PIXEL CLOCK RECOVERY

FIELD OF THE INVENTION

The invention relates generally to a method for recovering a pixel clock for generating a digital image from an analog video signal. In particular, the invention relates to a method for adjusting the frequency and the phase of the pixel clock.

BACKGROUND OF THE INVENTION

Conventional computer monitors are driven by analog video signals, including vertical and horizontal synchronization (sync) pulses. Vertical sync pulses serve as the timing reference for data and other features in each video frame in the analog video signal. Horizontal sync pulses are the timing reference for image data and signal features for each horizontal scanline in the video frame. The position of the image on the monitor can be adjusted automatically or manually by delaying the image data relative to the sync pulses. Minor variations in the shape or center position of the image with respect to the monitor do not significantly affect the appearance of the displayed image.

Recent developments in display device technology have resulted in monitors with fixed spatial resolution, such as flat panel displays and plasma monitors. The analog video signal provided to conventional analog monitors must be converted to a digital format in order to make the fixed resolution display compatible with traditional computer video cards.

Conversion of the analog video signal to digital format requires an accurate pixel clock and knowledge of the geometry of the digital image to be generated. In particular, the pixel clock frequency and the location of the image data in the analog video signal must be accurately known. Manufacturers generally comply with standards and guidelines such as those provided by the Video Electronics Standards Association (VESA). The VESA standard defines various signal characteristics including the front and back porch durations for horizontal scanlines and video frames, the active video portion, and the top, bottom, left and right borders (see VESA and Industry Standards and Guidelines for Computer Display Monitor Timing, Version 1.0, Revision 0.8, September 1998). Unfortunately, knowledge of a particular standard utilized by a display manufacturer is generally not sufficient to determine the required pixel clock necessary to drive the display. For example, front porch and back porch durations for the horizontal scanlines can vary between manufacturers of video cards in general compliance with the same VESA standard. Moreover, even if the pixel clock frequency is correct, an error in the phase of the pixel clock can result in unacceptable image degradation and image position shift.

SUMMARY OF THE INVENTION

The present invention relates to a method for converting an analog video signal into a digital format for display on a fixed resolution device. The invention overcomes image degradation associated with analog video signals that vary from standard values for a corresponding video mode.

Conversion of an analog video signal to a digital video signal suitable for a fixed resolution display requires knowledge of the pixel clock parameters used in the video card providing the analog video signal. In addition, knowledge of the active image size and the actual values for the horizontal and vertical front and back porches within a video frame is usually required. In general, the method of the invention includes generation of a pixel clock based on default values specified by an analog video standard. The resulting digital image is evaluated to determine whether the generated pixel clock is satisfactory and, if not, the pixel clock is modified in frequency and/or phase. The resulting modified pixel clock is used to generate another digital image for evaluation. Evaluation includes comparison of the digital image size and the image size specified in the video standard. This process of modifying the pixel clock and evaluating the resulting digital image is repeated until a satisfactory digital image is obtained. Because the method requires performing high-speed calculations during transmission of a video frame and lower speed calculations between video frames, the method can be implemented in both hardware and software. The hardware executes the high-speed processing during a video frame and the firmware conducts the lower speed processing between video frames.

The invention relates to a method for determining a pixel clock frequency. The pixel clock frequency is the rate at which the pixels are sampled from the analog video signal and is equal to the inverse of the sampling time for an individual pixel. An analog video signal is received and the on-transition and off-transition times of an active video portion of the analog video signal are detected. A number of pixels in the active video portion are determined in response to the detected on-transition and off-transition times. The number of pixels in the active video portion is compared with a predetermined pixel number. A modified pixel clock frequency is determined if the number of pixels in the active video portion is not equal to the predetermined pixel number.

In one embodiment, the method includes the additional steps of determining the number of pixels in the active video portion in response to the on-transition and off-transition times and the modified pixel clock frequency, comparing the number of pixels in the active video portion and the predetermined pixel number, and determining a different modified pixel clock frequency if the number of pixels in the active video portion is not substantially equal to the predetermined pixel number. In another embodiment, the step of determining a modified pixel clock frequency includes multiplying the horizontal sync pulse frequency of the analog video signal by a frequency multiplier if the number of pixels in the active video portion is substantially different from the predetermined pixel number.

The invention also relates to a method of adjusting the phase of the pixel clock. The phase of the pixel clock is defined relative to the on-transition time of the active video portion (or other component) of the analog video signal. The phase is changed by advancing or delaying the pixel clock in time relative to the analog video signal. The method includes receiving a first analog video frame signal and converting each of the active video portion of the analog video frame signal to pixel values based on the pixel clock. The method also includes determining a first image coordinate using the pixel values, decrementing the phase of the pixel clock by a first predetermined value, receiving a subsequent analog video frame signal, converting each of the active video portions of the subsequent analog video frame signal to subsequent pixel values based on the pixel clock having the decremented phase and determining a subsequent image coordinate from the subsequent pixel values. The first image coordinate and the subsequent image coordinate are compared and the steps of decrementing the phase of the pixel clock, receiving a subsequent analog video frame signal, converting each of the active video portions of the subsequent analog video frame signal and determining a subsequent image coordinate are repeated if the first image coordinate matches the subsequent image coordinate. If the first image coordinate does not match the subsequent image coordinate, the phase of the pixel clock is adjusted by a second predetermined value. In one embodiment, the second predetermined value is one half the period of the pixel clock.

In another aspect the invention relates to a system for generating a pixel clock. The system includes an analog-to-digital converter, an edge detection module, a processor, a comparator, and a clock generator. The analog-to-digital converter receives an analog video signal at a first input and the pixel clock at a second input, and provides pixel data to the edge detection module. Edge coordinates provided by the edge detection module are provided to the processor and the processor provides the number of pixels in the active video portion of the analog video signal to the comparator. The comparator generates an output signal responsive to the number of active pixels in the active video portion and a reference number of pixels. The processor provides to the clock generator a frequency multiplier signal that is responsive to the output signal from the comparator and edge coordinates. The clock generator generates the pixel clock which is provided as an input signal to the analog-to-digital converter.

In another embodiment the invention relates to a system for adjusting the phase of a pixel clock. The system includes an analog-to-digital converter, an edge detection module, a processor, a memory module and a phase adjuster. The analog-to-digital converter receives an analog video signal and provides pixel data to the edge detection module. Edge coordinates provided by the edge detection module are provided to the processor and the memory module. The memory module provides edge coordinates from prior video frames to the processor. The phase adjuster receives a phase control signal from the processor and the pixel clock, and generates a phase-adjusted pixel clock that is provided at the second input of the analog-to-digital converter.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DESCRIPTION OF THE INVENTION

Figure 1A:
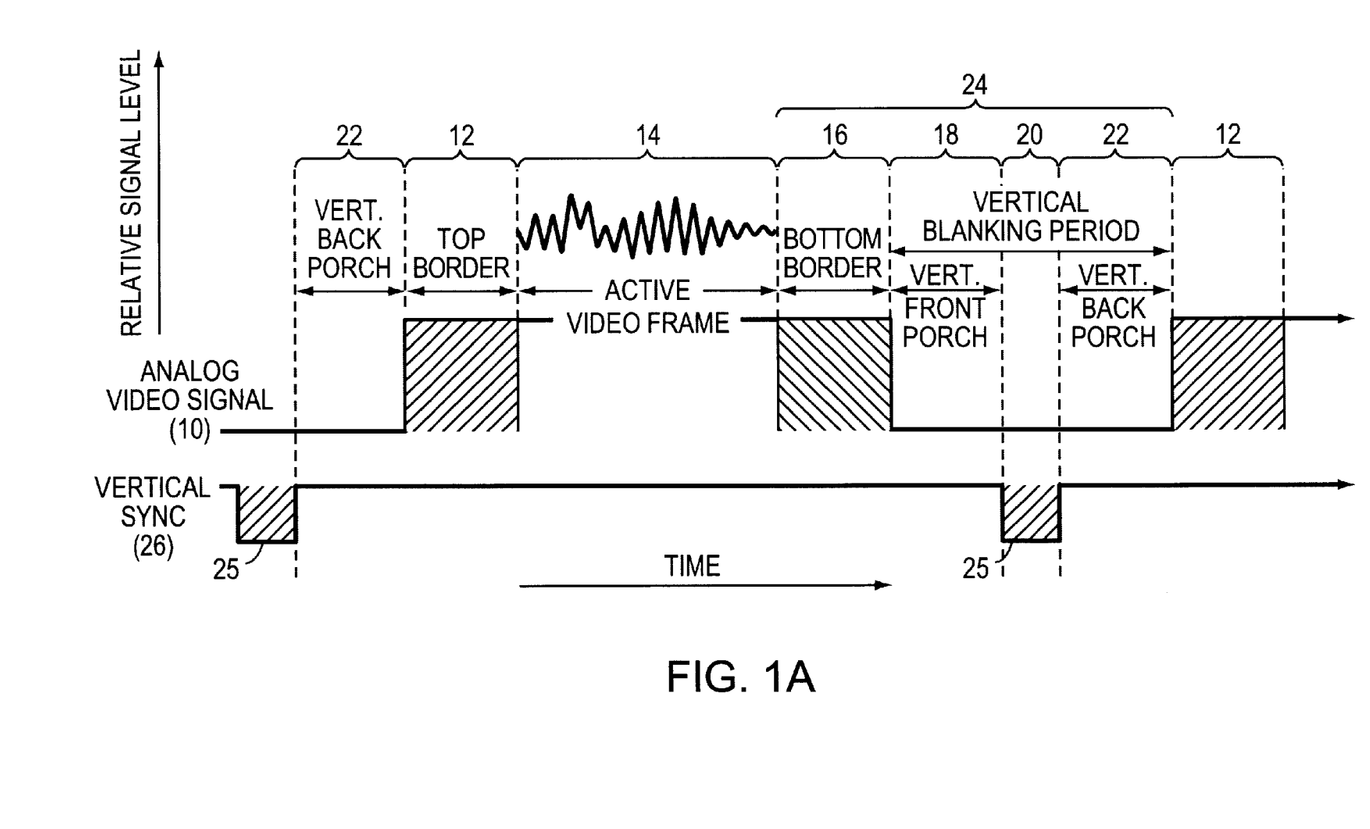
FIGS. 1A and 1B are conceptual diagrams showing various portions of an analog video signal.

Referring to FIG. 1A, an analog video signal 10 is synchronized to the sync pulses 20 of a vertical sync 26. The analog video signal 10 includes a top border 12, an active video frame portion 14 and a bottom border 16. A vertical blanking period 24 separates consecutive borders 12,16 and active video frames 14. The vertical blanking region 24 includes a vertical front porch 18 and a vertical back porch 22. The vertical front porch 18 occurs subsequent to the bottom border 16 and prior to a respective vertical sync pulse 20. The vertical back porch 22 occurs subsequent to the vertical sync pulse 20 and prior to the top border 12 of the next video frame (not shown). The foregoing signal characteristics (e.g., vertical front porch) are defined in the VESA and Industry Standards and Guidelines for Computer Display Monitor Timing, Version 1.0, Revision 0.8, September 1998 which is incorporated herein by reference.

Figure 1B:
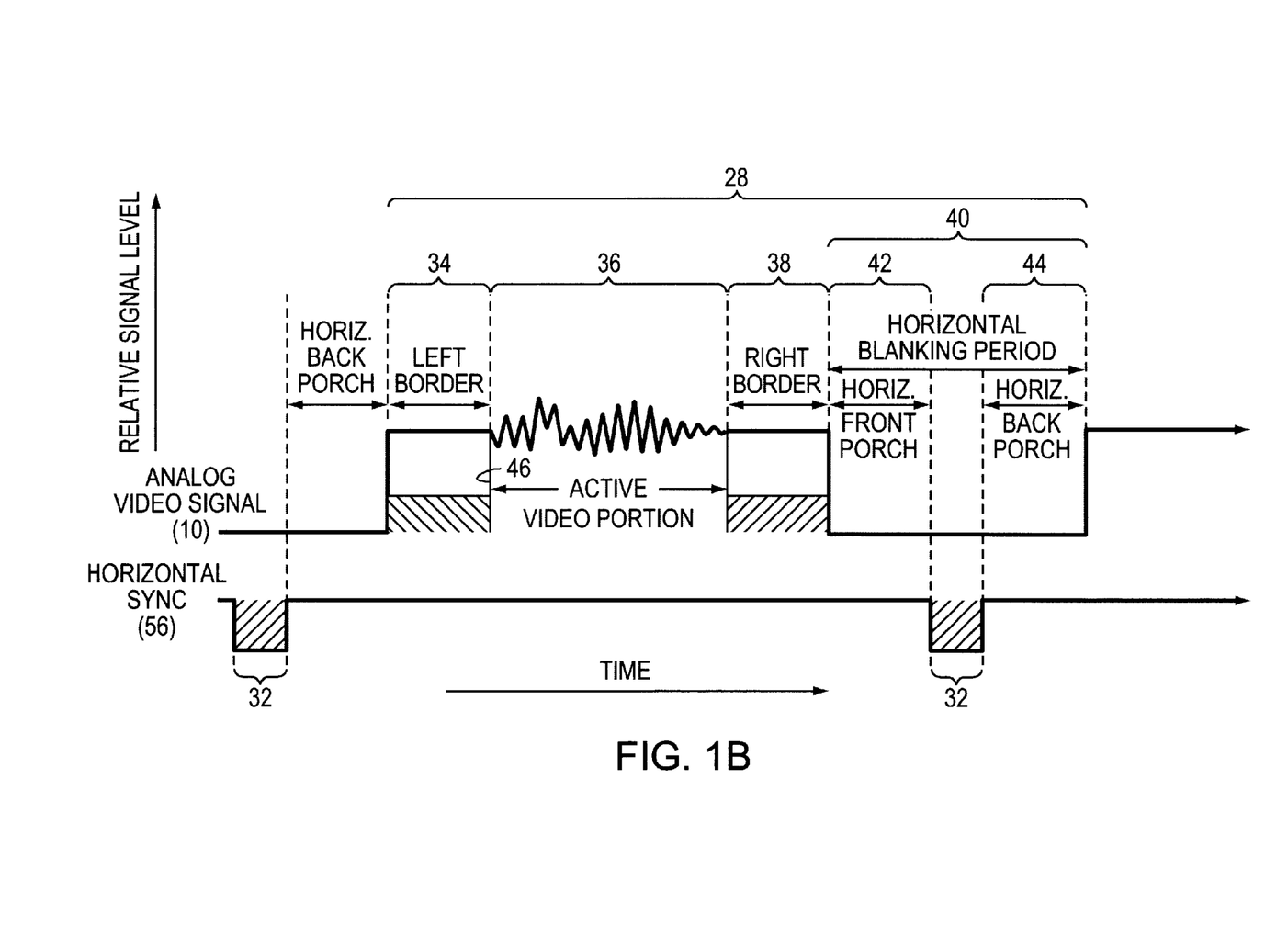

Each active video frame 14 includes multiple horizontal scanlines 28 as defined by the corresponding VESA standard. A single horizontal scanline 28 is shown in FIG. 1B. The horizontal scanlines 28 are synchronized with the sync pulses 32 of a horizontal sync 30, and each includes a left border 34, an active video portion 36 and a right border 38. A horizontal blanking period 40 separates consecutive borders 34,38 and active video portions 36. The horizontal blanking region 40 includes a horizontal front porch 42 and a horizontal back porch 44. The horizontal front porch 42 occurs subsequent to the right border 38 and prior to a respective horizontal sync pulse 32. The horizontal back porch 44 occurs subsequent to the horizontal sync pulse 32 and prior to the left border 34 of the next horizontal line portion 28.

Despite stated compliance with a given VESA standard, analog video cards often do not accurately generate analog video signals 10 in conformance with various parameter values identified in the standard. For example, the durations of the left and right borders 34,38 and horizontal front and back porches 42,44 can depart from the standard values. As a result, the on-transition time 46 of the active video portion 36 with respect to its horizontal sync pulse 32 is not reliable. Similarly, the duration of the active video portion 36 can also vary from the standard value.

Figure 2:
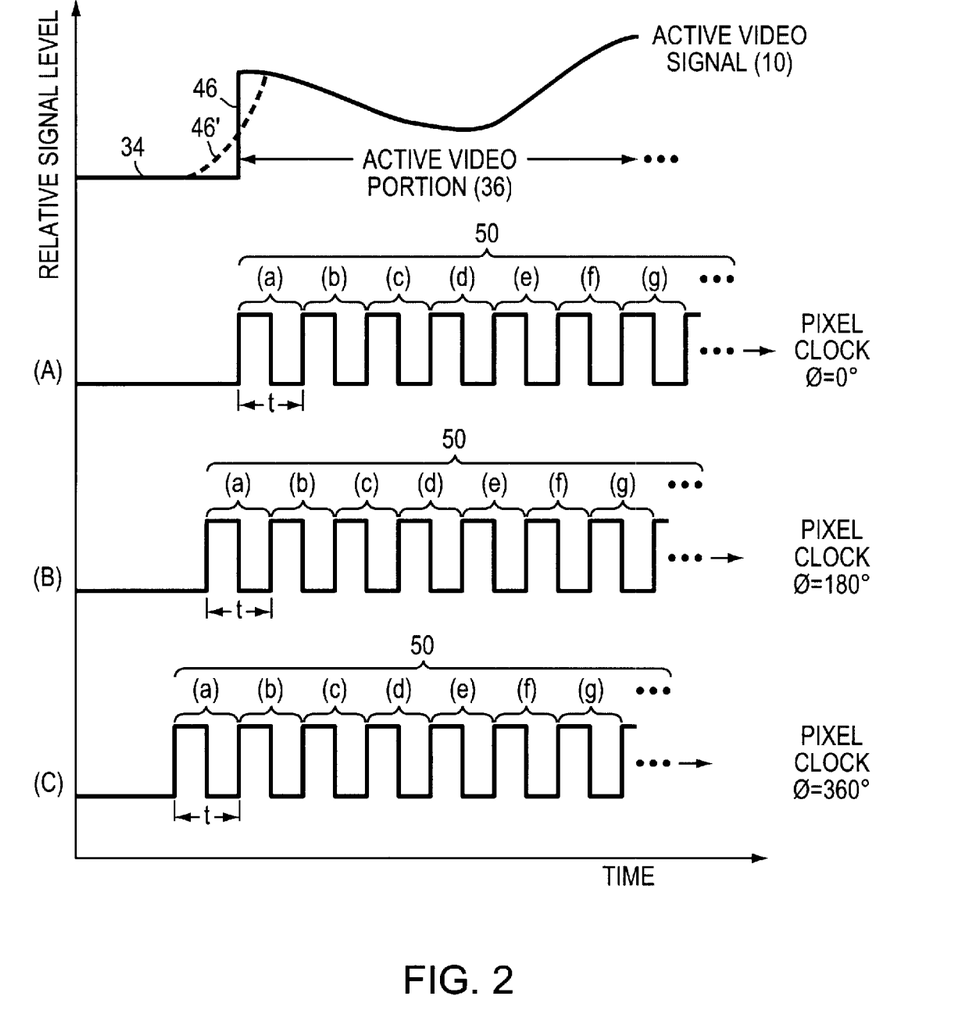
FIG. 2 is a conceptual diagram showing the relationship between the phase of the pixel clock and the active video portion of an analog video signal.

Referring to FIG. 2, a pixel clock 50 used in sampling the active video portion 36 of an analog signal 10 and converting to a digital signal (not shown) for display on a digital display (e.g., a flat panel display (FPD)) is shown in various phase relationships with the active video signal 10. The pixel clock includes consecutive pixel periods t designated individually as (a) through (g). Only seven pixel periods t are shown for clarity, however, the number N of pixel periods t for a horizontal scanline 28 is typically much greater and is given by the VESA standard (or other video standard) corresponding to the received analog video signal 10. Each pixel period t is equal to $$\frac{1}{v_{clk}}$$

where $v_{clk}$ is the pixel clock frequency.

If the duration of the active video portion 36 is less than or greater than that given in the VESA standard, then a default pixel clock 50 generated in accordance with the VESA standard incorrectly samples the analog data and the digital image is degraded. The pixel clock frequency $v_{clk}$ can be increased or decreased, respectively, so that the total sampling time Nt matches the actual duration of the active video portion 36.

Case (A) illustrates a pixel clock 50 with the proper phase relationship to generate an image in the proper position on the fixed resolution monitor. In this case, initiation of sampling for the first horizontal pixel (a) is simultaneous with the on-transition 46 of the active video portion 36. Because of limitations in the analog video card, the on-transition 46 typically occurs over a finite time as indicated by the dashed line 46'. As a result of the finite on-transition time 46', it is often difficult to synchronize the sampling of the first horizontal pixel (a) with the active video portion 36. As the pixel clock phase φ is advanced, the sampled value for the first pixel (a) decreases until half its sampling time t occurs prior to the on-transition 46 (Case (B)) and the image appears to abruptly shift on the fixed resolution monitor by one pixel. Further advancing the pixel clock phase φ reduces the value for the first pixel (a) until substantially all of its sampling time t occurs prior to the on-transition 46 (Case (C)).

Figure 3:
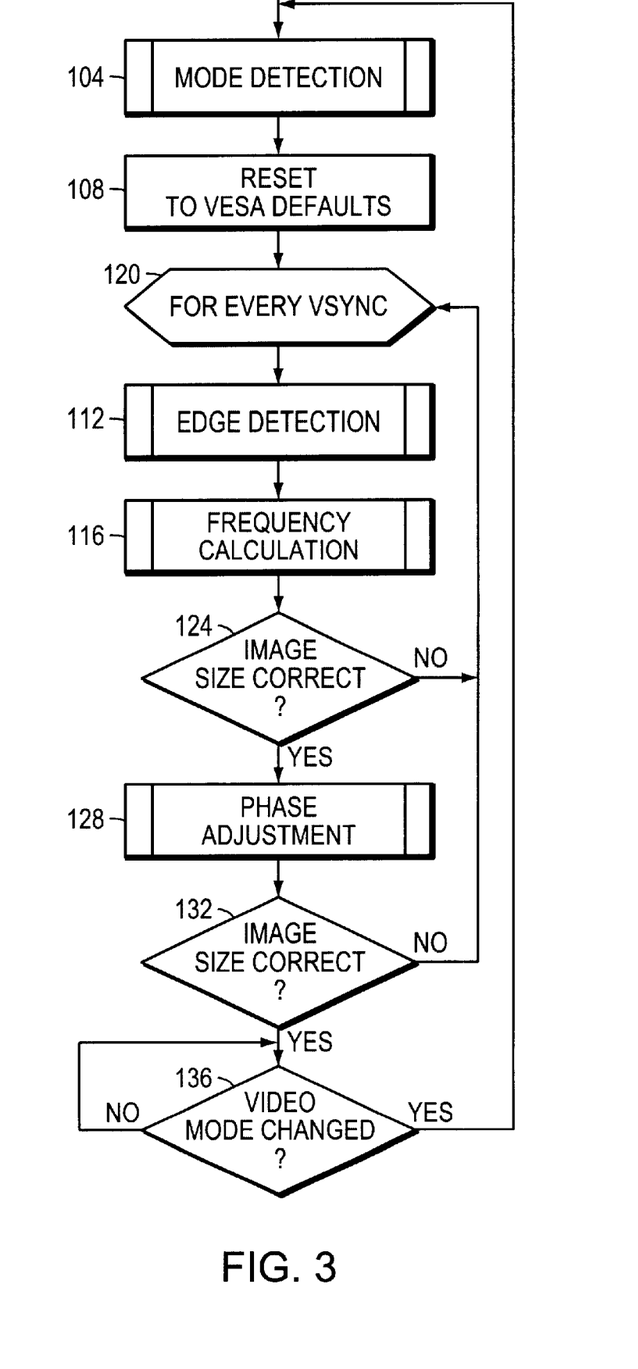
FIG. 3 is a flowchart representation of an illustrative method for generating a pixel clock according to one embodiment of the invention.

The flowchart of FIG. 3 depicts a method for generating a pixel clock for converting an analog video signal for display on a fixed resolution monitor according to one embodiment of the invention. The method includes detecting the video mode of the analog video signal to be displayed (step 104), resetting (i.e., initializing) pixel clock parameters to the default values prescribed by the standard for the detected mode (step 108), determining the edges (i.e., the on-transition and off-transition times) of the active video portion of each horizontal scanline (step 112), and calculating a pixel clock frequency and generating the corresponding pixel clock (step 116). The size (i.e., dimensions in pixels) of the digital image resulting from a pixel clock having the calculated pixel clock frequency is compared to the image size specified in the video mode standard (step 124). If the sizes do not match, the method returns to step 120, otherwise the method continues to step 128 in which the phase of the pixel clock relative to the active video portion of the horizontal scan lines is adjusted. Changes in the pixel clock phase can affect the image geometry so the method compares the size of the digital image with the standard size in step 132 and, if the sizes differ, the method returns to step 120 to determine the proper pixel clock frequency. The method includes repetitively monitoring for a change in the video mode (step 136). If a video mode change is detected, the method returns to step 104 to determine the appropriate pixel clock for the new video mode.

Figure 4:
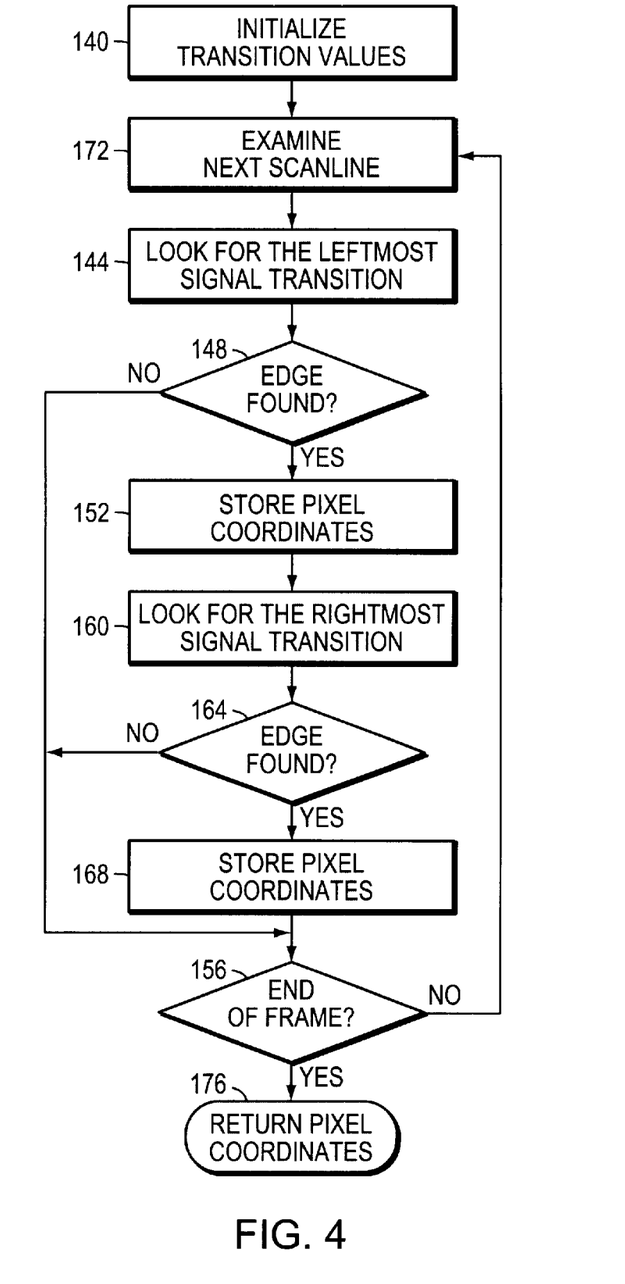
FIG. 4 is a flowchart representation of an illustrative method for edge detection as depicted in FIG. 3.

The flowchart of FIG. 4 depicts in more detail the edge detection of step 112 in FIG. 3. On and off-transition times are set to default values (step 140). Each horizontal scanline in the video frame is observed to determine its on-transition time (step 144). Whenever an on-transition time is determined (step 148), it is compared to the earliest previously determined on-transition time for the frame and stored if is the earliest on-transition time (step 152). If no on-transition is found (step 148), the method proceeds to step 156 to determine if the end of the current video frame has been detected. In step 160, each horizontal scanline in the video frame is observed to determine its off-transition time. Whenever an off-transition time is determined (step 164), it is compared to the latest previously determined off-transition time for the frame and stored if it is the latest off-transition time (step 168) before proceeding to step 156 to determine if the end of the current frame has been reached. If the comparison reveals that the off-transition time is not the latest off-transition time, the method proceeds to step 156 to determine if the end of the current frame has been reached. If an end of frame is not detected (step 156), the method returns to step 172 in which the next consecutive horizontal scanline is processed. This is important because the on-transition time and the off-transition time for the video frame do not generally occur on the same horizontal scanline. If the end of the current frame is detected (step 156), the method provides the current stored on and off-transition times in step 176.

Figure 5:
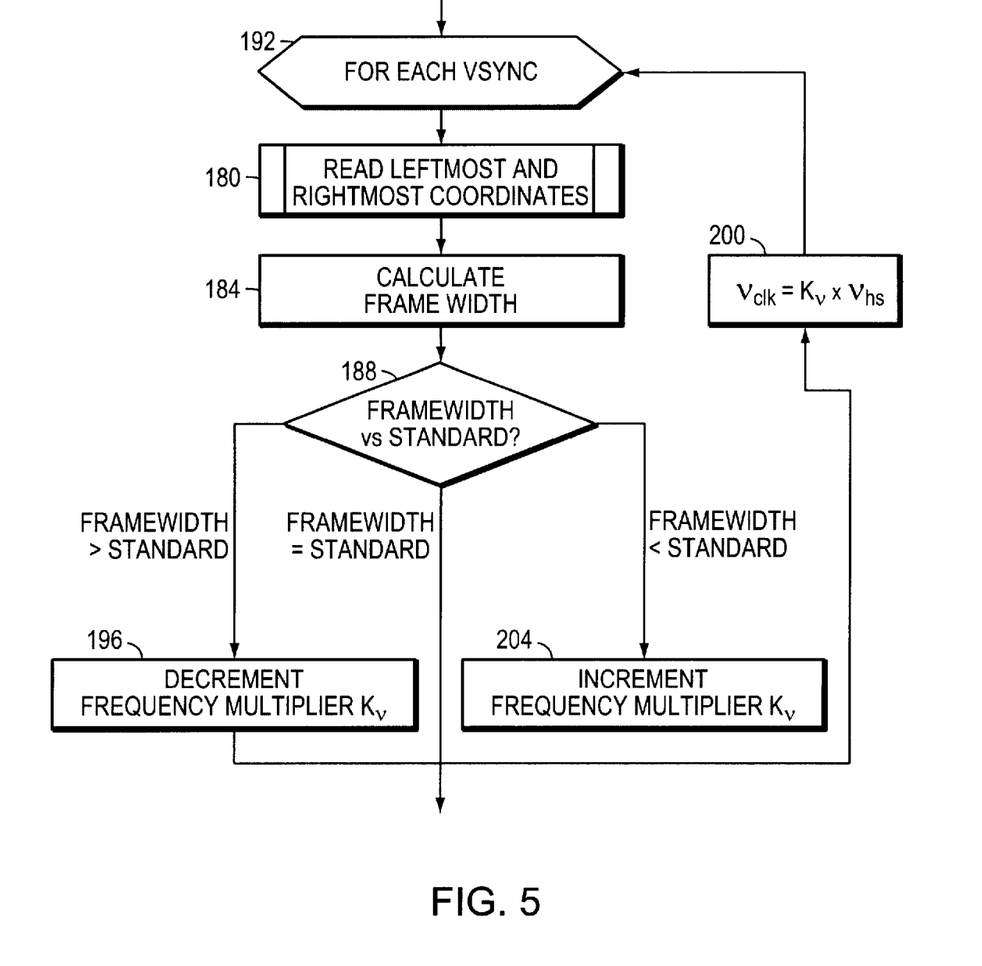
FIG. 5 is a flowchart representation of an illustrative method for frequency adjustment as depicted in FIG. 3.

The flowchart of FIG. 5 depicts in more detail the frequency calculation of step 116 in FIG. 3. The earliest on-transition time and the latest off-transition time for the frame are read (step 180) and used to calculate the frame width (step 184). The framewidth is compared against the framewidth for the video standard (step 188). If the current framewidth matches that of the video standard, the method maintains the current pixel clock frequency and the phase of the pixel clock is adjusted (see FIG. 3, step 128). If the framewidth is more than that of the video standard, a frequency multiplier $K_v$ is decremented (step 196) and the horizontal sync frequency $v_{hs}$ is multiplied by $K_v$ to yield a new pixel clock frequency $v_{clk}$ (step 200). Conversely, if the framewidth is less than that of the video standard, the frequency multiplier $K_v$ is incremented (step 204) and the horizontal sync frequency $v_{hs}$ is multiplied by $K_v$ to yield a new pixel clock frequency $v_{clk}$ (step 200).

Figure 6:
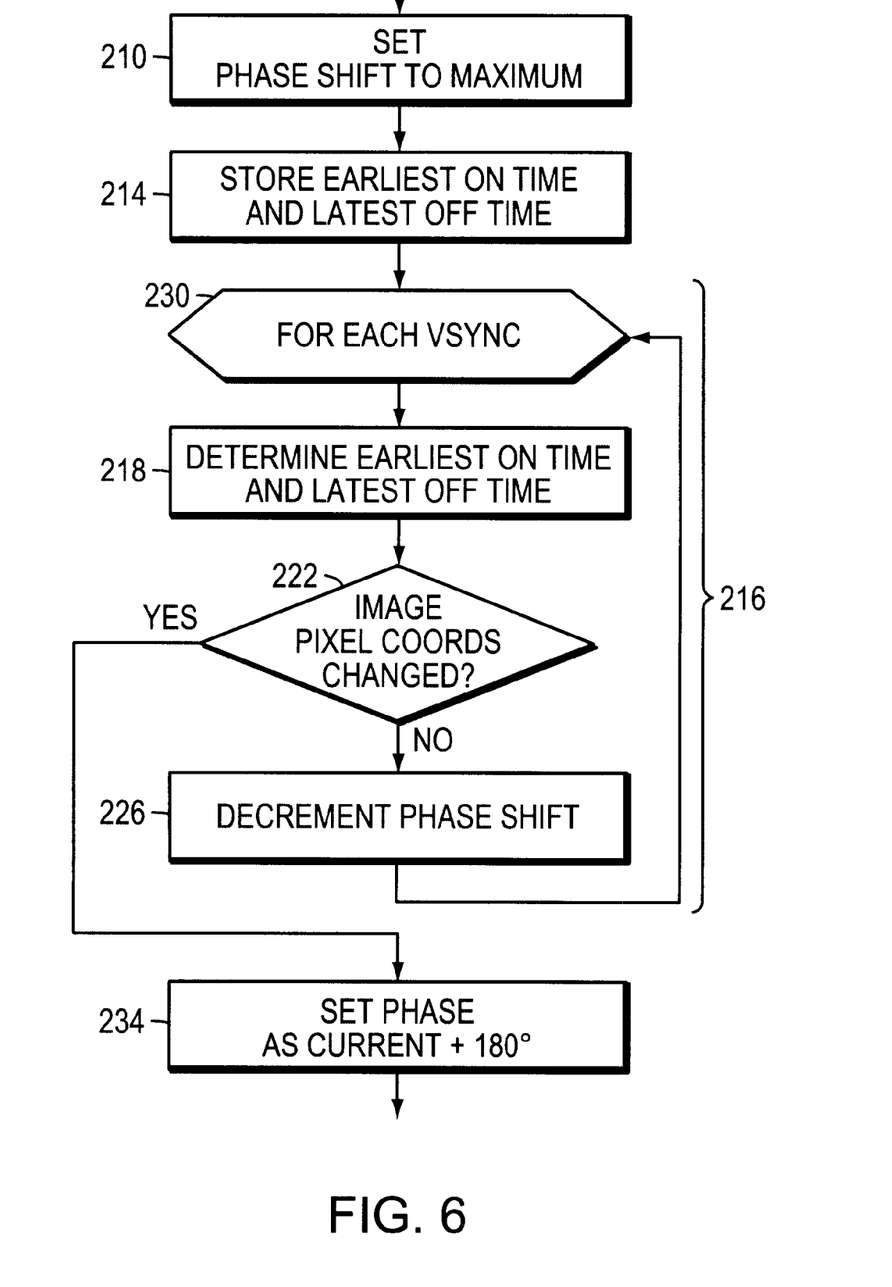
FIG. 6 is a flowchart representation of an illustrative method for phase adjustment as depicted in FIG. 3.

The phase of the pixel clock relative to the active video portion can be improved by an incremental phase adjustment technique (see step 128 in FIG. 3). The digital image is evaluated after each incremental adjustment to the phase of the pixel clock. The image appears to shift by one pixel when the phase of the pixel clock changes sign (i.e., passes through 0°). Referring to the flowchart of FIG. 6 for a more detailed description of the phase adjustment technique, the phase of the pixel clock with respect to the active video portion is shifted to a maximum value which is less than the pixel period t (step 210). The earliest on-transition time and latest off-transition time for the resulting video frame are determined (step 214). The technique for phase adjustment uses a repetitive sequence to identify the desired phase for the pixel clock (loop 216). First, the earliest on-transition time and latest off-transition times for the video frame are determined (step 218). Next, the resulting digital image is examined to see if the corresponding image pixel coordinates (i.e., edge coordinates) have changed (step 222). If no change is detected, the phase of the pixel clock is decremented (step 226) and the method returns to step 230 to continue with the next video frame. If the image coordinates have changed in step 222, then the phase is increased by 180° (i.e., the pixel clock is advanced in time by t/2) (step 234).

Figure 7:
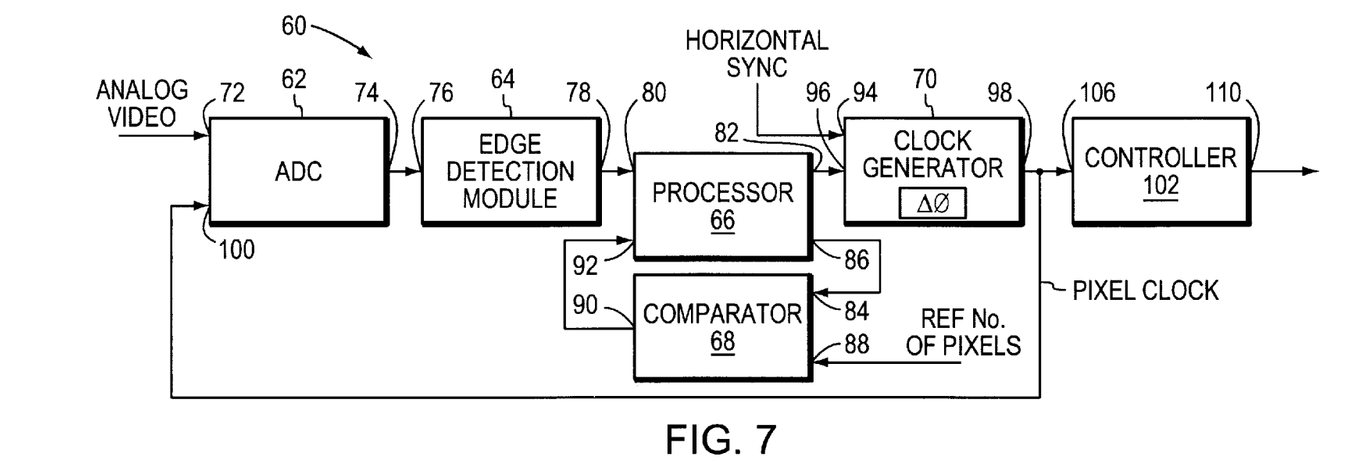
FIG. 7 is a functional block diagram of a system for recovering a pixel clock according to one embodiment of the invention.

Referring to FIG. 7, a system 60 for generating a pixel clock includes an analog to digital converter (ADC) 62, an edge detection module 64, a processor 66, a comparator 68 and a clock generator 70. The ADC has a first input 72 to receive an analog video signal and an output 74 to provide pixel data. The edge detection module 64 has an input 76 coupled to the output 74 of the ADC 62 and an output 78 to provide the pixel coordinates of the earliest on-transition and latest off-transition times for each video frame. The processor 66 has a first input 80 coupled to the output 78 of the edge detection module 64 and a first output 82 to provide a clock control signal. The comparator 68 has an input 84 coupled to a second output 86 of the processor 66 to receive a signal indicative of the number of pixels in the active video portion of the current horizontal linescan, a second input 88 to receive a signal indicative of the number of pixels in the horizontal linescan according to a video mode standard, and an output 90 coupled to a second input 92 of the processor 66 for providing a comparator output signal that is responsive to the signals received at the comparator inputs 84,88. The clock generator 70 has a first input 94 to receive a horizontal sync, a second input 96 coupled to the first output 82 of the processor 66 to receive the clock control signal, and an output 98 to provide a pixel clock. The output 98 of the clock generator 70 is coupled to a second input 100 of the ADC 62.

Optionally, the system 60 also includes a controller module 102 having a controller input 106 coupled to the output 98 of the clock generator 70 and a controller output 110. The controller module 102 generates a digital display signal at its output 110 for displaying a digital image on a digital monitor.

Figure 8:
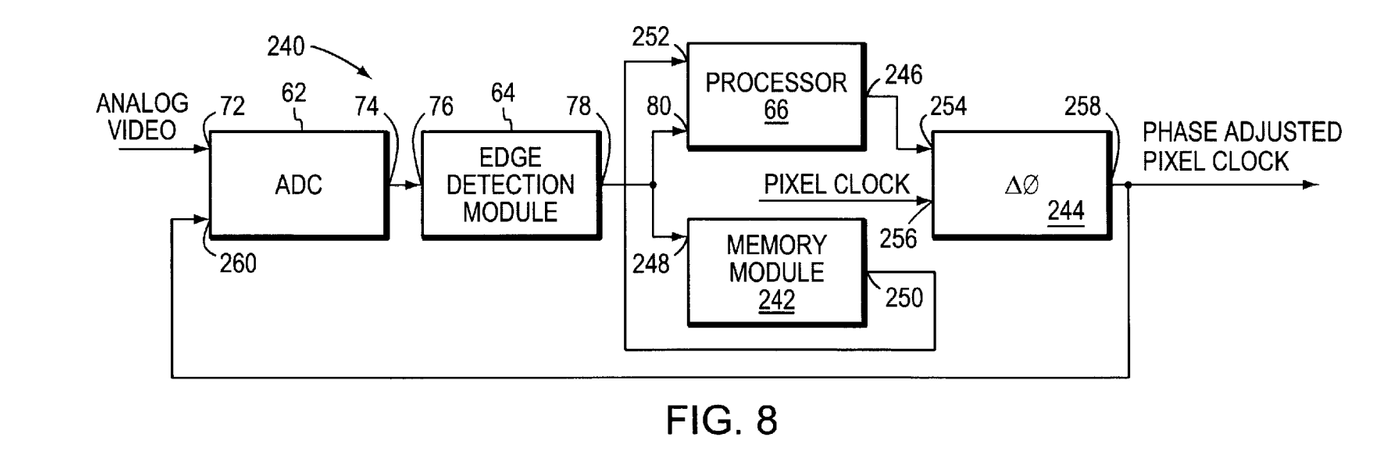
FIG. 8 is a functional block diagram of a system for adjusting the phase of a pixel clock according to one embodiment of the invention.

Referring to FIG. 8, a system 240 for adjusting the phase of a pixel clock includes an ADC 62, an edge detection module 64, a processor 66, a memory module (i.e., a buffer) 242 and a phase adjuster module 244. The ADC has a first input 72 to receive an analog video signal and an output 74 to provide pixel data. The edge detection module 64 has an input 76 coupled to the output 74 of the ADC 62 and an output 78 to provide the pixel coordinates of the earliest on-transition and latest off-transition times for each video frame. The processor 66 has a first input 80 coupled to the output 78 of the edge detection module 64 and an output 246. The memory module 242 has an input 248 coupled to the output 78 of the edge detection module 64 and an output 250 coupled to a second input 252 of the processor 66. The memory module 242 provides the pixel coordinates of the earliest on-transition and latest off-transition times for the immediately prior video frame at its output 150. The processor 66 generates a phase control signal at its output 246 in response to the pixel coordinates received at its first and second inputs 80 and 252, respectively. The phase adjuster module 244 has a first input 254 to receive the phase control signal from the output 246 of the processor 66, a second input 256 to receive a pixel clock and an output 258 coupled to a second input 260 of the ADC. The phase adjuster module 244 generates a phase-adjusted pixel clock at its output 258 in response to the phase control signal and the pixel clock.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of adjusting the phase of a pixel clock comprising:

receiving a first analog video frame signal having a plurality of active video portions;

converting each of the active video portions of the analog video frame signal to a first plurality of pixel values in response to a pixel clock, the pixel clock having a period and having a phase relative to the active video portion;

determining a first image coordinate using the first plurality of pixel values;

decrementing the phase of the pixel clock by a first predetermined value;

receiving a subsequent analog video frame signal having a plurality of active video portions;

converting each of the active video portions of the subsequent analog video frame signal to a subsequent plurality of pixel values in response to the step of decrementing the phase of the pixel clock;

determining a subsequent image coordinate using the subsequent plurality of pixel values;

comparing the first image coordinate and the subsequent image coordinate;

repeating the steps of decrementing the phase of the pixel clock, receiving a subsequent analog video frame signal, converting each of the active video portions of the subsequent analog video frame signal, and determining a subsequent image coordinate if the first image coordinate equals the subsequent image coordinate; and adjusting the phase of the pixel clock by a second predetermined value if the first image coordinate does not equal the subsequent image coordinate.

2. The method of claim 1 wherein each of the first analog video signal and the subsequent analog video signal has a plurality of frames, each of the plurality of frames having a plurality of horizontal sync pulses.

3. The method of claim 2 wherein each of the plurality of horizontal sync pulses precedes a respective active video portion.

4. The method of claim 1 wherein the second predetermined value is one half the period of the pixel clock.

5. A system for generating a pixel clock comprising:

an analog-to-digital converter having a first converter input to receive an analog video signal having an active video portion, a second converter input and a converter output;

an edge detection module having an input in communication with the output of the analog-to-digital converter and an output to provide edge coordinates;

a processor having a first processor input in communication with the output of the edge detection module, a second processor input, a first processor output and a second processor output, the processor generating a frequency multiplier signal at the first processor output, the processor generating a pixel number signal indicative of the number of pixels in the active video portion at the second processor output;

a comparator having a first comparator input in communication with the second processor output, a second comparator input to receive a signal indicative of a reference number of pixels and a comparator output in communication with the second processor input, the comparator generating a comparator output signal responsive to the pixel number signal and the reference number of pixels; and a clock generator having a first clock generator input in communication with the first output of the processor, a second clock generator input to receive a horizontal sync and a clock generator output in communication with the second converter input, the clock generator providing a pixel clock at the clock generator output in response to the frequency multiplier signal and the horizontal sync.

6. The system of claim 5 further comprising a controller module having a controller input in communication with the clock generator output to receive the pixel clock and a controller output, the controller module providing a display control signal at the controller output in response to the pixel clock.

7. The system of claim 5 wherein the processor comprises a phase shifter, the phase shifter adjusting the phase of the pixel clock with respect to the active video portion of the analog video signal.

8. A system for adjusting the phase of a pixel clock comprising:

- an analog-to-digital converter having a first converter input to receive an analog video signal having a plurality of video frames, a second converter input and a converter output to provide pixel data;
- an edge detection module having an input in communication with the output of the analog-to-digital converter and an output to provide edge coordinates;
- a processor having a first processor input in communication with the output of the edge detection module, a second processor input and a processor output to provide a phase control signal;
- a memory module having a memory input in communication with the output of the edge detection module and a memory output in communication with the second processor input, the memory module providing an edge coordinate from a prior video frame at the memory output; and
- a phase adjuster having a first input in communication with the processor output, a second input to receive the pixel clock, and an output in communication with the second converter input, the phase adjuster providing a phase-adjusted pixel clock at the output of the phase adjuster in response to the phase control signal and the pixel clock.

9. The system of claim 8 wherein the phase adjuster generates a phase-adjusted pixel clock having a phase difference with respect to the pixel clock of one half the period of the pixel clock if the current image coordinate does not equal the prior image coordinate.

* * * * *